United States Patent [19]

Warner et al.

[11] Patent Number: 4,966,388
[45] Date of Patent: Oct. 30, 1990

[54] INFLATABLE STRUCTURES FOR SIDE IMPACT CRASH PROTECTION

[75] Inventors: Charles Y. Warner; Charles E. Strother, both of Orem, Utah; Donald E. Struble, Phoenix, Ariz.; Milton G. Wille, Provo, Utah

[73] Assignee: Collision Safety Engineering Inc., Orem, Utah

[21] Appl. No.: 356,533

[22] Filed: May 25, 1989

[51] Int. Cl.$^5$ .................... B60R 21/16; B60R 21/00
[52] U.S. Cl. .................................. 280/730; 280/734
[58] Field of Search ............... 280/730, 728, 731, 732, 280/743, 734; 180/271

[56] References Cited

U.S. PATENT DOCUMENTS

| 3,897,961 | 8/1975 | Leising et al. | 280/730 |
| 3,927,901 | 12/1975 | Weman | 280/730 |
| 3,981,520 | 9/1976 | Pulling | 280/730 |

Primary Examiner—Richard A. Bertsch

[57] ABSTRACT

An inflatable protective system provides cushioning and containment of an occupant of a vehicle from side impact of the vehicle by another object. The system includes an inflatable bag which is foldabble into a collapsed, relatively compact configuration for placement within a door of a vehicle. An inflator and an impact sensor are also mounted within the door, with the inflator being in flow communication with the bag. Upon impact of the door, the sensor activates the inflator to inflate the bag. The inflated bag forms a substantially broad, planar air cushion having dimensions sufficient to extend over the window opening in the door. The inflated bag forms a shock absorbing cushion that prevents the occupant's head from striking the door elements and also acts as a cushioning barrier to restrain the occupant's head from being ejected through the window opening.

26 Claims, 6 Drawing Sheets

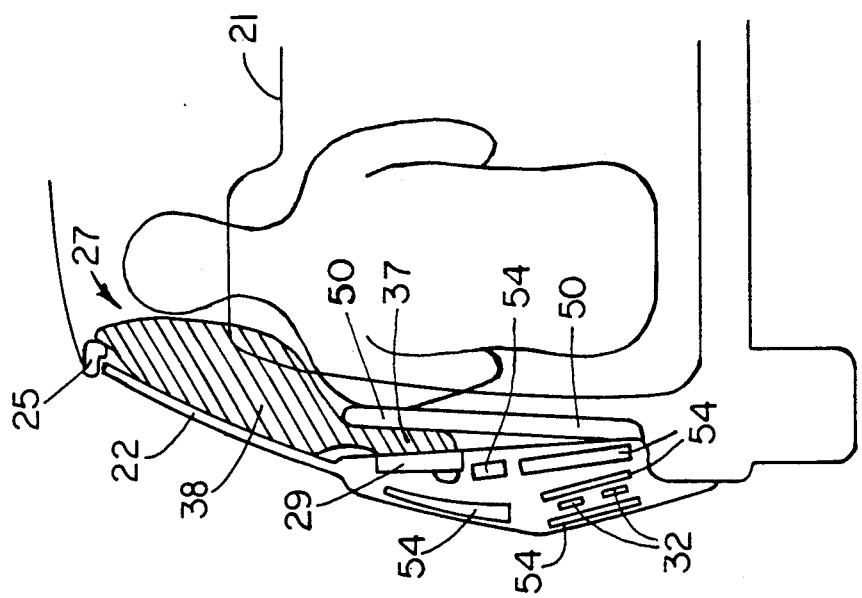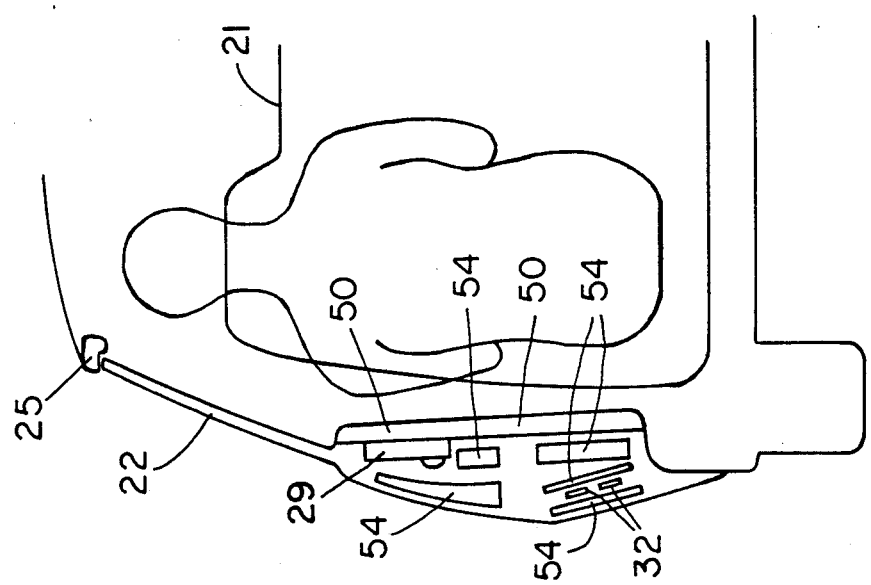

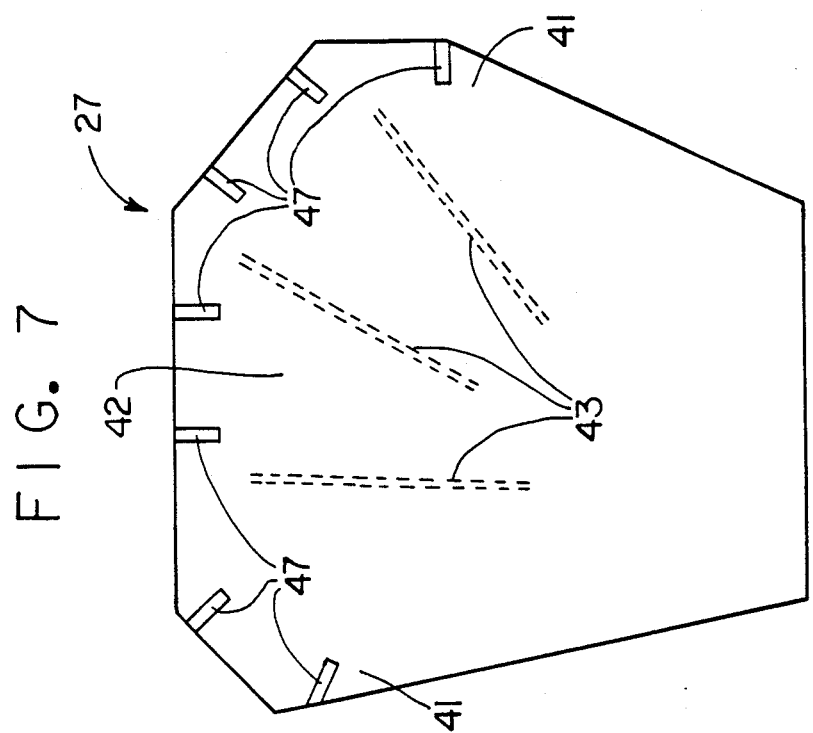
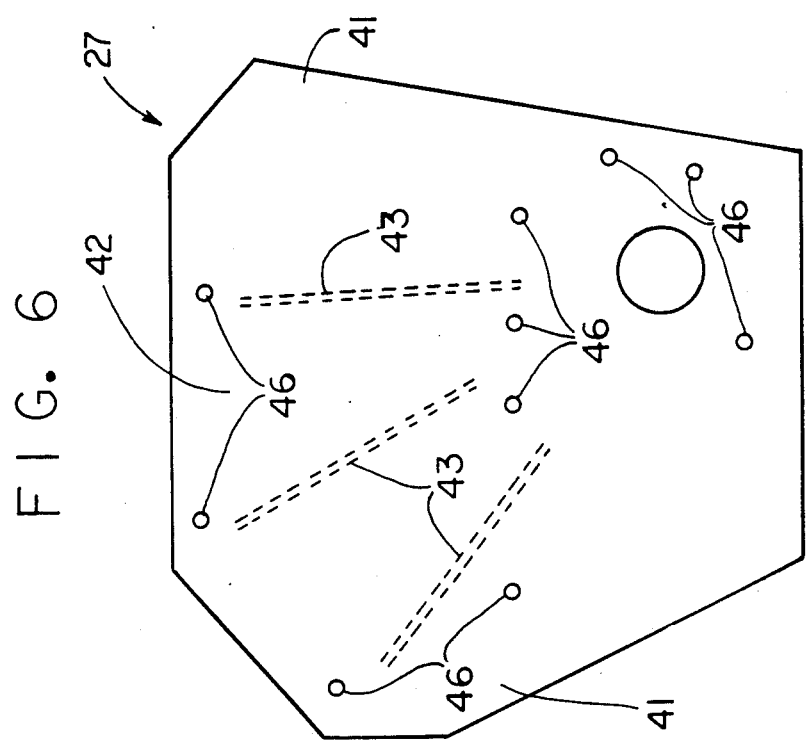

INFLATABLE STRUCTURES FOR SIDE IMPACT CRASH PROTECTION

BACKGROUND OF THE INVENTION

1. Field of the Invention

The present invention relates to inflatable restraint devices used in automotive vehicles for restraining movement of an occupant and cushioning contact between the occupant and structural members of the vehicle during an accident. In particular, the invention relates to such restraint devices which are contained in a side panel of the vehicle and which provide protection from side impacts of the vehicle.

2. State of the Art

Inflatable restraint devices for restraining occupants of automotive vehicles involved in frontal collisions are of course well known. Such systems employ air bags which are inflated rapidly in response to a collision, with the inflated air bags providing a cushioning and restraint for the occupants from impact with the steering wheel, instrument panel and windshield of the vehicle. For examples of such systems see U.S. Pat. Nos. 3,642,303; 3,758,133 and 4,097,065.

The inflatable restraint systems of the prior art generally do little to provide essential protection to an occupant of a vehicle during accidents involving impact of the side of the vehicle. During side impact collisions, seat belts do little more than prevent occupants from impacting each other and prevent total ejection of an occupant from the vehicle. In a side impact collision the occupant is subject to dangerous contact with the side of the vehicle next to which the occupant is seated and the distinct possibility exists of partial ejection of and injury to the occupant's head, neck and shoulders through the window area of that side of the vehicle. Conventional restraint systems have not adequately addressed these problems.

Some limited protection in side impact collisions is afforded by conventional padding applied to the interior surfaces of the side panel, but space and comfort limitations along the interior of the side panel preclude use of sufficient padding depth to be of significant value in a moderate-to-severe accident. In U.S. Pat. No. 3,791,667, it was proposed to provide a housing recessed in a side panel of a vehicle, with the housing having an open side facing the interior of the vehicle. An elastomeric, stretchable membrane was secured over the open side of the housing, having its peripheral edges sealed to the housing. In a collision, gas under pressure was delivered to the housing to expand the membrane toward the interior of the vehicle to form a cushion for the torso of an occupant seated adjacent thereto. The system of U.S. Pat. No. 3,791,667 does not, however, provide any cushioning of the occupants' shoulders and head from impact with a window in the side panel, the window frame, the roof pillar adjacent the side of the window or the roof rail adjacent the upper side of the window. Nor does such system offer any restraint against the occupant's head and neck from being thrown through the window.

In U.S. Pat. No. 3,897,961, inflatable restraint apparatus is disclosed which include folded air bags stored in the roof structure of the vehicle. A torso bag is deployed from the roof of the vehicle toward the lap of the occupant. In addition, an inflatable side curtain bag is deployed from the roof to, at least theoretically, extend downward between the occupant and a side window in the side panel of the vehicle. If properly inflated and positioned, the side curtain would provide side cushioning of the head and shoulders of the occupant and inhibit movement of the occupant's head through the window or against the roof rail. Unfortunately, however, the source of gas for inflating both the torso bag and the curtain bag is located out of the passenger compartment, and a conduit extends from the gas source to the respective air bags.

To be effective in side impact collisions, a restraint system must offer essentially immediate padding and restraint to the entire flank of the occupant. Timing of air bag deployment is absolutely critical. In a typical crash, each millisecond delay represents about one-half inch of side panel or door penetration. The system of U.S. Pat. No. 3,897,961 has not been used commercially, and it is likely that delays in activating the gas generator and then of transmitting the gas to the air bags would be far too long for the system to work effectively. In addition, the system is bulky, relatively complex and would be excessively costly.

An even more complex system is disclosed in U.S. Pat. No. 3,687,485. An air bag is deployed downwardly from the roof structure of the vehicle toward the rear seat thereof. A series of pulleys and cables are provided for pulling a screen downwardly over the side window of the vehicle as the air bag is deployed. The system of Pat. No. 3,687,485 has not been used commercially possibly due to its excessive complexity or its potential to iflict injury during deployment.

SUMMARY OF THE INVENTION

A principal objective of the invention is to provide a novel, relatively inexpensive, air bag, restraint system which is located within the side panel of an automotive vehicle so as to preserve roominess and comfort space within the vehicle, with the system being simple in mechanical construction and operation yet highly effective in affording protection to an occupant seated adjacent to the side panel of the vehicle during a collision involving impact of that side panel of the vehicle with another object.

A particular objective of the present invention is to provide such an air bag restraint system which can be deployed relatively instantaneously from the side panel of the vehicle to offer essentially immediate padding and restraint for the entire flank of the occupant seated adjacent to such side panel.

Another objective of the present invention is to provide an air bag system of the type described wherein protection is afforded essentially instantaneously to the flank of the occupant, with the system simultaneously providing a cushioning barrier to restrain the occupant's head and neck from moving into the window or window opening in the side panel as well as from contacting the window frame, roof pillar or roof rail of the side panel.

Another objective of the present invention is to provide such an air bag restraint system wherein the cushioning barrier further restrains the occupant's head from moving through the window or window frame to thereby avoid severe injury which could otherwise be incurred through contact with an object outside the window of the vehicle.

Yet another objective of the present invention is to provide an air bag system of the type described wherein a cushioning panel made of resilient, foamed, polymeric material is provided as the inboard face of the side panel, and when the air bag is inflated, the cushioning panel is propelled toward the occupant to provide immediate cushioning contact with the occupant's torso and to initiate lateral movement of the occupant away from the side panel so as to minimize the subsequent impact between the side panel and the occupant.

A further objective of the present invention is to provide an air bag system of the type described wherein the system includes a highly reliable sensor mechanism housed within the side panel of the vehicle together with the air bag and gas generating means, with the sensor mechanism being mechanically simple, relatively inexpensive, and capable of faithfully sensing an impact to the side panel of the vehicle of a specified severity, while avoiding undesirable, false deployment of the air bag due to normal vehicle usage or to impacts of less severity.

A still further objective of the present invention is to provide an air bag system of the type described wherein voids in the side panel of the vehicle are filled with a resilient, foamed, polymeric material to increase cushioning, hasten early displacement of the occupant in a direction away from the object impacting the side panel of the vehicle and dissipate force by crushing of the foamed material by the object impacting the side panel.

Another objective of the present invention is to provide an air bag restraint system in which the air bag is mounted, in the uninflated, standby state, entirely within the side panel of a automotive vehicle, with the uninflated bag being folded and stored in a compartment within the side panel such that upon external impact with the exterior side of the panel, the air bag initially inflates inwardly toward the torso of an occupant seated adjacent to the side of panel and then continues to inflate both inwardly and upwardly along the interior of the side panel to rapidly cover a window in the upper portion of the side panel, all within a matter of several milliseconds.

An additional objective of the present invention is to provide such an air bag system wherein a plurality of vent openings are activated in sequence as the air bag is inflated to provide controlled venting of gas to moderate peak pressures within the inflating air bag and to further develop thrust from the venting gases to enhance deployment of the air bag upwardly along the interior of the side panel of the vehicle.

The above objectives are achieved in accordance with the present invention by providing a novel air bag restraint system which is contained, in its uninflated, standby state, entirely within a side panel of an automotive vehicle. By being contained within the side panel, the present system has the advantage of preserving roominess in the vehicle.

The system of the present invention incorporates an inflatable air bag and padding to provide protection from side impact collisions with the vehicle. A folded air bag and an associated inflator, which is capable of inflating the air bag, are contained in a compartment within the side panel of the vehicle. A sensor mechanism which is adapted to activate the inflator is preferably positioned within the side panel. A strategically located, remote sensor can be used, especially in combination with the local sensor positioned within the side panel. The system further includes a finish cover for the side panel which forms the inner, finished face of the side panel. The cover is preferably formed from a substantially planar panel made of resilient foamed polymeric material.

Upon impact of the side of the vehicle with another object, with sufficient force to be sensed by the sensor, the inflator is activated to inflate the air bag. During the initial inflation stage, the air bag inflates toward the torso of the occupant. The foamed planar cushioning panel forming the internal face of the side panel is propelled ahead of the inflating bag toward the torso of the occupant. The expanding bag and the foamed cushioning panel make cushioned contact with the occupant's torso and produce early lateral movement of the occupant away from the side panel and the intruding object which has collided with occupant's vehicle. This early movement of the occupant reduces the force of the inevitable impact which follows between the occupant and the side panel and object intruding into the side panel.

The initial deployment of the air bag is followed with an upward inflation of the bag along the interior side of the side panel. The air bag when fully inflated has a generally planar, broad shape designed to cover the relatively large shoulder and head contact areas of the occupant. The inflated air bag expands fore and aft of the side panel as well as upwardly so as to cover the upper portion of the side panel and in particular any window, roof pillar and roof rail in the vicinity of the occupant's head. The inflated air bag barrier restrains the occupant's head, neck and shoulders from moving into the window or window opening, thereby preventing partial or total ejection of the occupant's head from the vehicle. The air bag also restrains the occupant's head from striking the window, window frame, roof pillars adjacent to the sides of the window and the roof rail adjacent to the top of the window.

Additional objects and features of the invention will become apparent from the following detailed description, taken together with the accompanying drawings.

THE DRAWINGS

A preferred embodiment of an air bag restraint system in accordance with the present invention representing the best mode presently contemplated of carrying out the invention are illustrated in the accompanying drawings in which:

FIG. 2 is a simplified, diagramatical section through the door panel of FIG. 1 showing the door incorporated into a vehicle, with an occupant seated next to the door;

FIG. 3 is a view similar to that of FIG. 2 but showing the air bag in its inflated, expanded condition;

FIG. 6 is a side view of an inflated, expanded air bag in accordance with the present invention showing the side of the bag which faces the door panel;

FIG. 7 is a view similar to that of FIG. 6 but showing the opposite side of the bag, that is the side facing the occupant;

DETAILED DESCRIPTION OF THE ILLUSTRATED EMBODIMENT

Figure 1:
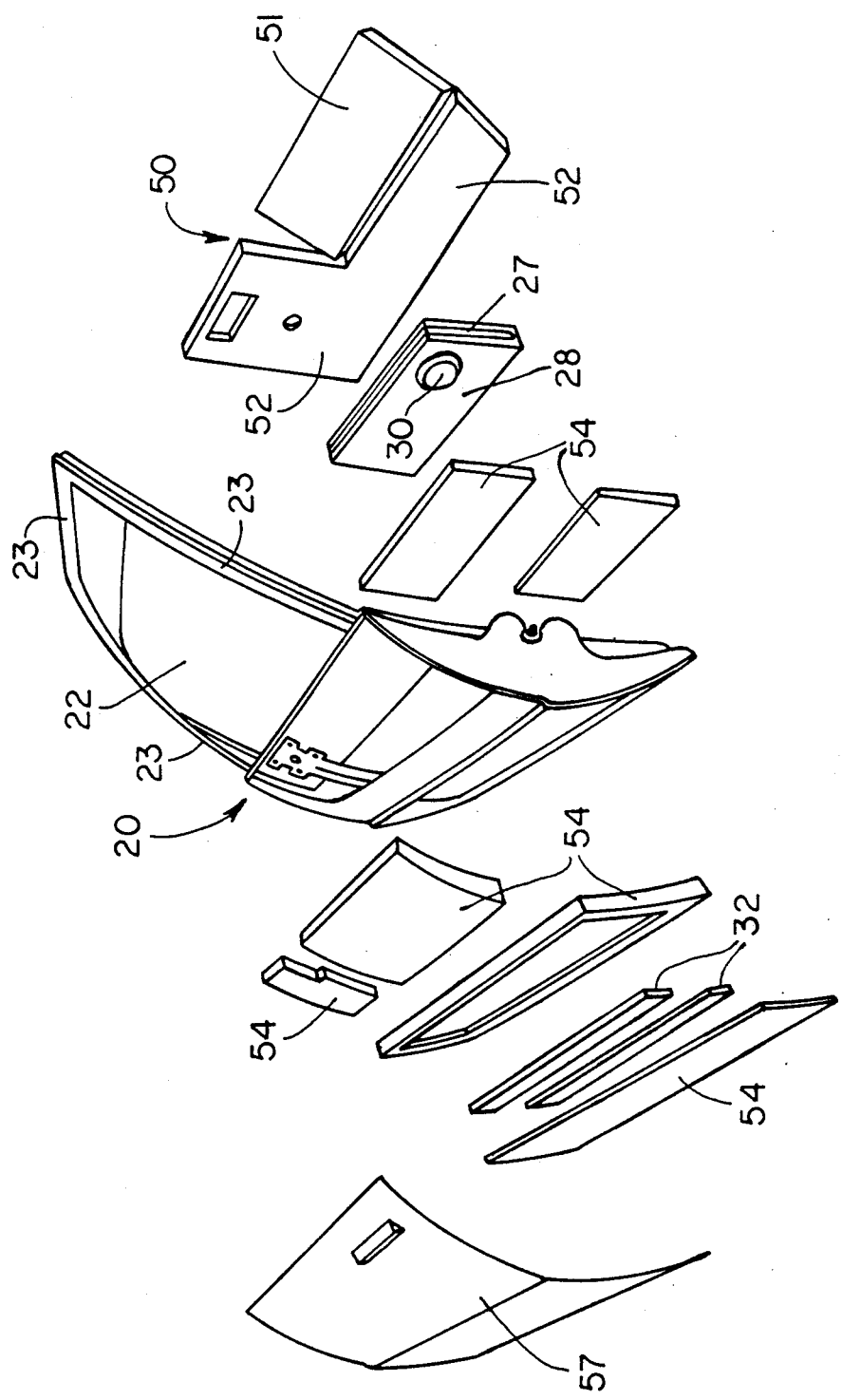
FIG. 1 is an exploded, pictorial representation of a door of a vehicle containing the air bag restraint system of the present invention.

Referring to the drawings, an inflatable protective system is shown which provides cushioning and containment of an occupant of a vehicle from a collision involving side impact of the occupant's vehicle with another object such as another vehicle. As illustrated, the occupant's vehicle, is a conventional automobile having a side panel 20 located adjacent to the end of a seat 21 upon which the occupant to be protected is seated. The side panel 20, as illustrated, is a side door of the automobile and will be referred hereinafter as a door panel. It should be recognized, however, that the invention is applicable to a side panel of an automotive vehicle generally and is not restricted to a door panel or to any particular type vehicle. For instance, the invention could be applied to the side panels adjacent to the back seat of a conventional two door automobile, as well as doors and side panels of trucks. In the illustrated embodiment, a window 22 and appropriate window frame 23 are located at the upper end of the door panel 20. A roof pillar 24 is located adjacent to a vertical side of the window 22, and a roof rail 25 is positioned adjacent to an upper side of the window 22.

Figure 5:
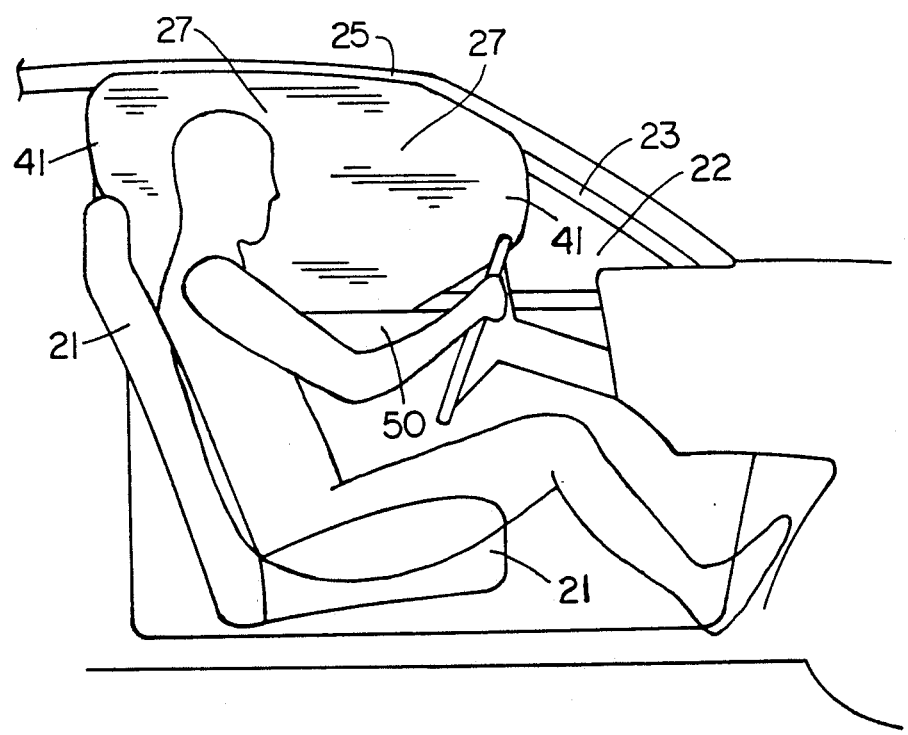
FIG. 5 is a view similar to that of FIG. 4 but showing the air bag in its inflated, expanded condition.

The restraint system of the present invention includes an inflatable bag 27 which can be folded into a collapsed, relatively compact configuration. A detailed description of one preferred procedure used in folding the bag 27 will be given later herein. Bag 27 is adapted to be inflated to form a substantially broad, planar air cushion as shown in FIGS. 3 and 5, with the dimensions of the inflated bag 27 being sufficient to extend substantially over the window 22 in the door panel 20 as shown in FIG. 5.

The folded bag 27 is mounted and stored within the door panel 20 at a location below the window 22, with the folded bag 27 facing the occupant's torso when the occupant is seated on the seat 21. An inflator 30 is mounted within the door panel 20 and in flow communication with the folded bag 27. An impact sensor 32 is also mounted within the door panel 20. One or more similar sensors, and possibly a system of microswitches, can be located adjacent to the first sensor or at strategically located, remote positions. The sensors 32 are capable of activating the inflator 30 to inflate the bag 27 when an impact of a specified severity is made with another object, such as another vehicle, and the door panel 20. The inflated bag 27 forms a shock absorbing cushion for the head and flank of the torso of the occupant and a cushioning barrier to restrain the occupant's head, neck and shoulders from moving toward or through the window 22 or of engaging the roof pillar 24, window frame 23 and roof rail 25.

The folded bag 27 is mounted in a cavity 29 (FIGS. 2, 3 and 4) formed within the door panel 20 of the vehicle. Preferably, an air bag module is provided for insertion into the cavity 29. The air bag module is shown in FIG. 1, 10, 12 and 13. The module includes a rigid backup plate 28 which is to be positioned at the inner side of the cavity 29. The inflatable bag 27 is folded into a substantially planar pouch which is positioned within the cavity 29 adjacent to the backup plate 28. The module further includes the inflator means 30, which is mounted to the backup plate 28 so as to be in direct flow communication with the folded air bag 27. The inflator 30 is advantageously mounted on one side of the backup plate 28 and communicates with the bag 27 through an access opening 31 in the backup plate 28. An exhaust port 33 of the inflator 30 is coupled directly to an access opening in the bag 27. The inflator 30 is preferably a pyrotechnic inflator which is commercially available for use in inflating air bags in the automobile industry.

Figure 13:
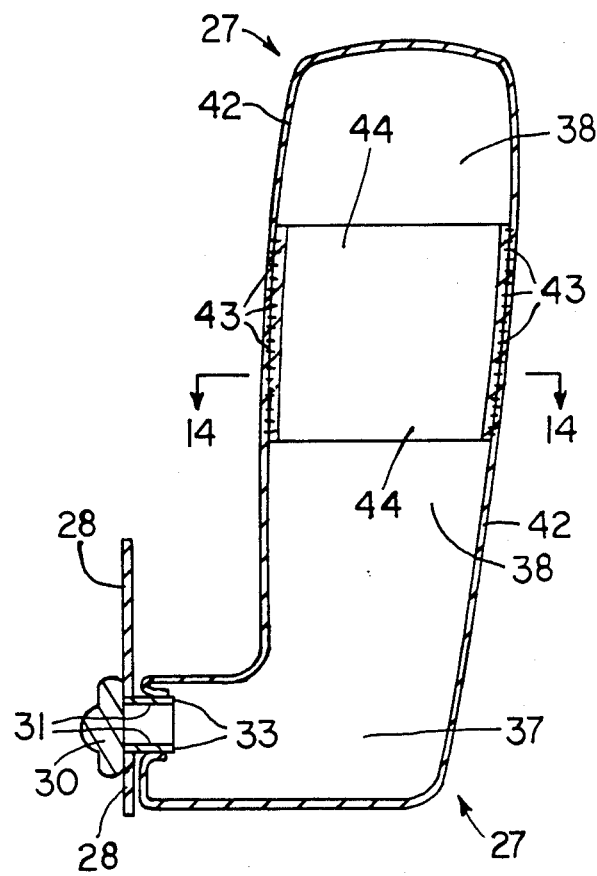
FIG. 13 is a view similar to that of FIG. 12 but showing the air bag in its inflated, expanded condition.

As shown in FIGS. 3 and 13, the air bag 27 comprises two sections, with the first section 37 being attached to the inflator 30. Section 37 is the first to inflate when the bag 27 is inflated and is adapted to expand substantially instantaneously toward the interior of the vehicle from the cavity 29. As the inflation of the bag 27 continues, the second section 38 extends from the upper side of the first section 37 and expands upwardly over the window 22 in the door panel 20, as best shown in FIGS. 3 and 5. Complete inflation of both sections 37 and 38 of the bag 27 is extremely rapid, occurring in about 30 to 50 milliseconds.

The bag 27, when inflated, preferably has fore and aft extensions 41 as shown in FIGS. 5, 6 and 7. The extensions 41 fan out from a central portion of the bag 27 during inflation to extend to the fore and aft sides of the window 22. The fan shaped extensions 41 allow the first section 37 of the bag 27 to have a much smaller lateral dimensions than that of the second section 38 and the window 22. The smaller size of the first section 37 with respect to the second section 38 accommodates the substantially instantaneous inflation of the first section 37, the benefit of which will be more fully described hereinafter.

Figure 8:
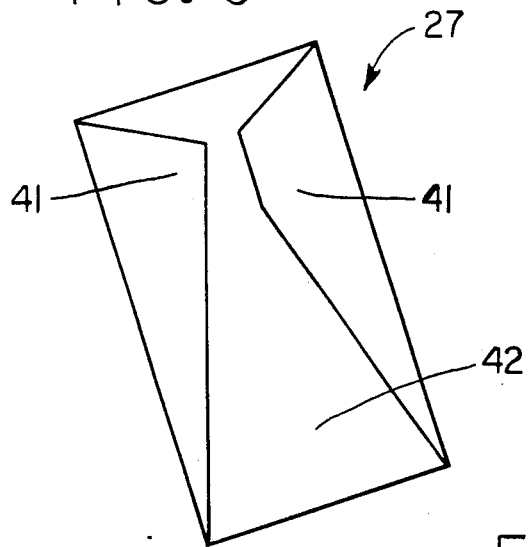
FIG. 8 shows a flat air bag in accordance with the present invention in the first stage of folding the bag into a planar pouch to be placed within the door of FIG. 1.
Figure 9:
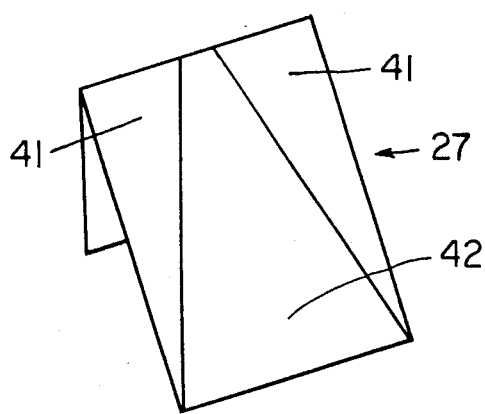
FIG. 9 is a view similar to that of FIG. 8 but showing the bag in the second stage of folding.
Figure 10:
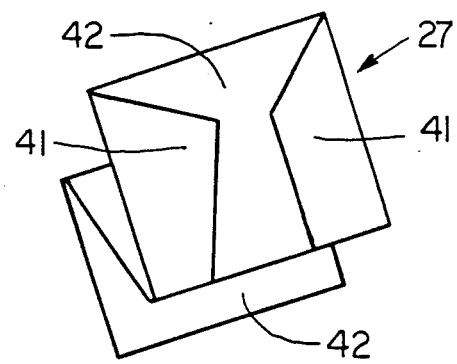
FIG. 10 is a view similar to that of FIGS. 8 and 9 but showing the bag in the third stage of folding.
Figure 11:
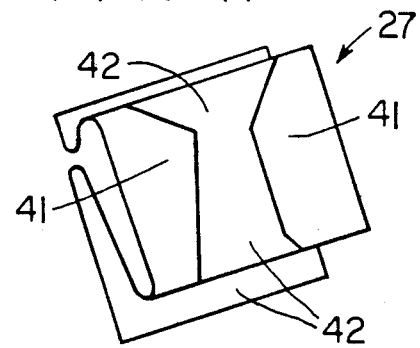
FIG. 11 is a view similar to that of FIGS. 8, 9 and 10 but showing the bag in the final stage of folding into the planar pouch.
Figure 12:
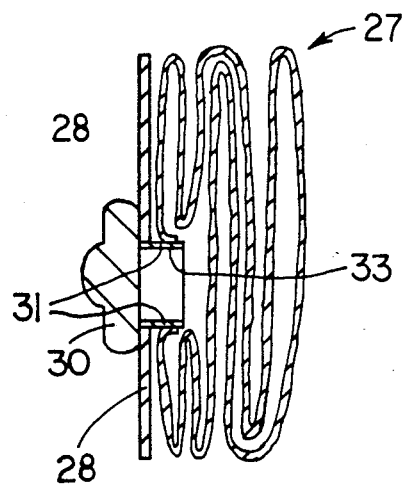
FIG. 12 is a vertical section through the folded air bag module of FIG. 1.

For storage in the cavity 29, the bag 27 is preferably folded into a substantially planar pouch. A sample folding technique is shown in FIGS. 1 and 8 through 12. The pouch can be formed by folding the upper portion of the bag 27 downwardly in at least two accordion folds to overlie the lower portion of the bag 27. The resulting, planar pouch is then inserted into the cavity 29 so that the folded upper portion of the bag 27 faces the interior of the vehicle. A preferred technique for folding the bag 27 is illustrated in FIGS. 8 through 12. First, the fore and aft sections 41 are folded inwardly as shown in FIG. 8 so as to lie over or be nested inside the central, generally rectangular portion of the bag 27. The upper about one-third portion of the generally rectangular formation is then folded backwardly as shown in FIG. 9 to lie behind the central about one-third portion of the bag 27. The upper and central portions are then folded forwardly about the bottom edge of the central portion so as to overlie the front of the lower about one-third portion of the bag 27 as shown in FIG. 10. A final S-shaped fold can be formed in the free upper edge of the upper portion of the bag 27 if desired, as shown in FIG. 11.

Figure 14:
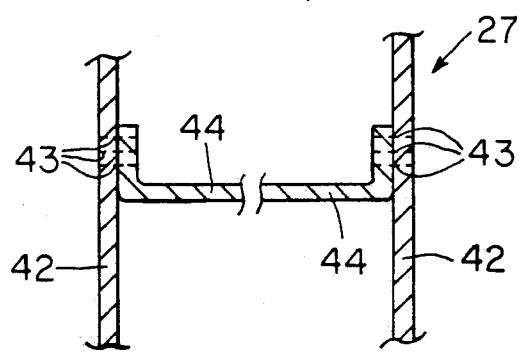
FIG. 14 is a section taken along line 14—14 of FIG. 13.

As shown in FIGS. 13 and 14, the bag 27 comprises two broad sheets 42 of material which, when the bag 27 is inflated, face each other and form outboard and inboard sides of the inflated bag 27. The outboard side of the inflated bag 27 lies adjacent to the door panel 20 and faces the window 22 thereof, and the inboard side of the bag 27 faces the interior of the vehicle. To maintain strength as well as the generally flat shape of the upper section 38 of the inflated bag 27, the two sheets of material 42 forming the upper section 38 are stitched together with reinforcing stitching 43 which attaches spaced linear ribs or tethers radiating outwardly from the first section 37 of the bag 27. Advantageously, as shown in FIGS. 13 and 14, the air bag 27 is reinforced with fabric webs 44 which form part of the ribs. The webs 44 extend from one of the side sheets 42 of the bag 27 to the other. The opposite lateral sides of the webs 44 are sewn to the side sheets 42 by the stitching 43. The webs 44 aid in maintaining proper thickness of the air bag 27 when it is inflated as well as to reinforce and add strength to the bag 27.

A plurality of vent openings 46 are preferably provided in the outboard side of the upper or second section 38 of the bag 27 as shown in FIG. 6. The vent openings 46 are spaced apart over the side of the bag 27 and allow controlled venting of gas during inflation of the bag 27 to moderate pressure peaks within the bag during inflation. The openings 46 also provide jet thrust to the inflating bag 27 to enhance deployment of the bag adjacent to the window 22 of the door panel 20. Preferably, at least one vent opening 46 is also provided in the lower or first section 37 of the bag 27. The openings 46 in the lower section 37 of the bag 27 primarily aid in controlling venting of gas during inflation of the bag 27 to moderate pressure peaks within that portion of the bag during inflation.

Figure 4:
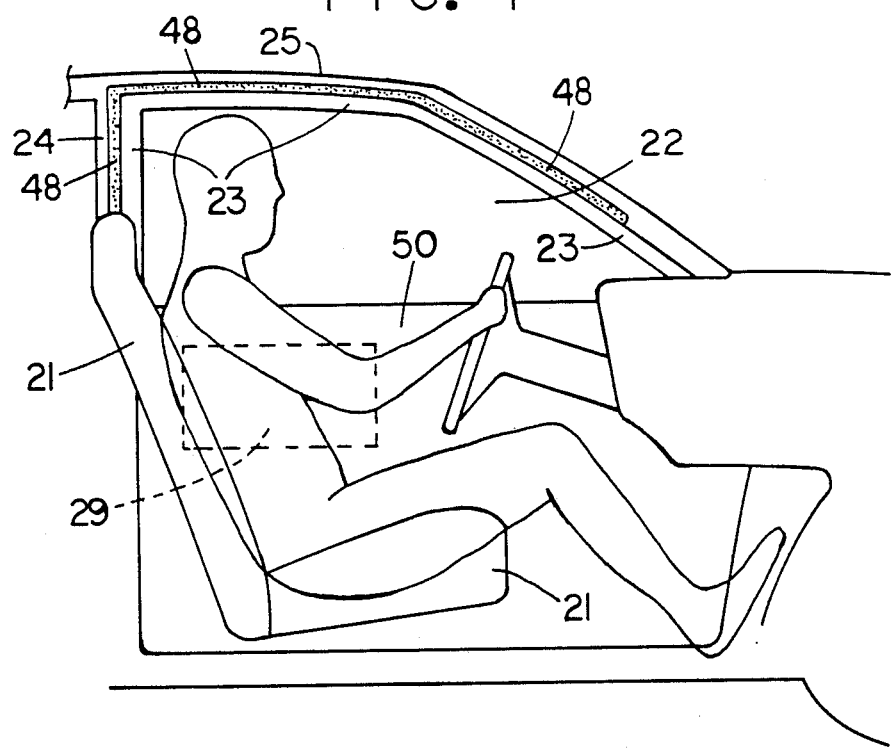
FIG. 4 is a simplified, diagramatical, side view of the occupant and the inside of the door of FIG. 2.

One of the important functions of the air bag 27 of the present invention is to form a barrier for preventing the occupant's head, neck and shoulders from impacting the window frame 23, roof pillar 24 and roof rail 25, as well as to stop the occupant's head and neck from being ejected through the window 22 where serious contact could be made with objects on the outside of the vehicle. The air bag 27 inflates so as to cover the window area and thus form the barrier. To aid in holding the barrier firmly in place during the accident, touch attachment means are provided on the periphery of the second section 38 of the bag 27 and on the roof rail 25 and roof pillar 24 which are adjacent to the window 22 of the door panel 20. The touch attachment means secure the periphery of the second section 38 of the bag 27 to the roof rail 25 and roof pillar 24 when the bag 27 is inflated to firmly hold the inflated bag 27 in place as a barrier over the window 22. As shown in FIGS. 4 and 7, the touch attachment means preferably comprises two part releasable connectors of the hook and loop type. A representative type hook and loop connector is marketed under the trademark Velcro. One part 47 of the connectors is attached about the periphery of the second section 38 of the bag 27, and the second part 48 of the connectors is attached along the roof rail 25 and roof pillar 24. As illustrated, a continuous strip of the part 48 of the connector extends along the roof pillar 24 and roof rail 25. Elongate patches of the other part 47 of the connector are sewn to the air bag 27 as shown in FIG. 7. The elongate patches are spaced about the upper perimeter of the bag 27, with the patches extending inwardly toward the central portion of the bag 27.

The air bag 27 cooperates with strategically positioned foam cushioning material to provide exceptional load distribution and acceleration peak-shaving to the occupant during a side impact collision. A substantially planar cushioning panel 50 of foamed polymeric material is positioned on the inboard side of the door panel 20, such that the cushioning panel 50 lies over the stored, folded bag in the cavity 29 of the door panel 20. A finish formed on the outer surface of the cushioning panel 50 forms the finished inboard side of the door panel 20. The cushioning panel 50 is preferably made of a foamed polymeric material such as polyethylene having 20 psi crush resistance. The panel 50 is generally from about one inch to three inches thick, preferably about two inches. Upon collision and inflation of the air bag 27, the cushioning panel 50 is propelled inwardly toward the occupant to make initial cushioned contact with the occupant's torso and to initiate lateral movement of the occupant away from the door panel 20. Such movement of the occupant will minimize the relative speed at which the door panel 20 of the automobile makes contact with the occupant during the collision.

As best shown in FIG. 1, the cushioning panel 50 is formed of a first section 51 which lies immediately over the cavity 29 in the door panel 20 and a second section which lies over the remainder of the door panel 20 below the window 22. The first section 51 is attached to the second section 52 by a hinge connecting the lower edge of the first section 51 to the second section 52, such that when the bag 27 is inflated, the first section 51 of the cushioning panel 50 pivots about its lower hinged edge to form an opening through which the inflating bag 27 is rapidly ejected outwardly and upwardly from the cavity 29. The inflating bag 27, at the same time, propels the cushioning panel 50 laterally toward the occupant. The hinge is preferably a live hinge formed by a skin of the foamed polymer material which integrally joins the first and second sections 51 and 52 of the cushioning panel 50.

It can now be appreciated why it is important to achieve an almost instantaneous inflation of the lower section 37 of the air bag 27 prior to the inflation of the upper section 38 as mentioned above. The rapid inflation of the lower section 37 provides rapid movement of the cushioning panel 50 toward the occupant such that the cushioning panel comes into contact with the occupant before the door panel 20, propelled inward by the impacting object, makes contact with the occupant. The cushioning panel distributes forces over the torso of the occupant and further moves the occupant in a direction away from the door panel. This movement of the occupant reduces the relative speed with which the door panel subsequently impacts the occupant. In addition, the displacement of the cushioning panel 50 away from the door panel 20 provides sufficient space for the upper section 38 of the bag 27 to inflate upwardly to its operative position in which it provides protection to the upper torso and head of the occupant.

To provide additional cushioning and padding, and to enhance the promptness of occupant-load applications, all otherwise void space between the outboard side and inboard side of the door panel 20 is preferably filled with foamed polymeric material. As shown in the drawing, slabs 54 of rigid foamed material can be cut and fitted into void spaces in the door panel 20. In a production vehicle, this cushioning material would likely be molded to fit in the void spaces. The cavity 29 is advantageously formed in this cushioning material such that the cushioning material supports the air bag module.

In side impact collisions, the inflation of the air bag 27 must be extremely rapid. There must be a minimal delay between the impact and the actuation of the inflator 30. In the present design, the inflator 30 has been positioned in direct fluid communication with the air bag 27 to achieve ultra-rapid inflation once the inflator 30 has been activated. The sensor system must be reliable and not subject to false alarms. Above all it must instantaneously sense the impact and actuate the inflator 30. In accordance with a preferred embodiment of the invention, elongate strip sensors 32 are positioned about one inch inside the outer door skin 57 in the areas likely to be impacted by the bumper of a colliding vehicle. The strip sensors 32 are advantageously cemented into an elongate slot opening in the foam padding of the door panel assembly 20 or otherwise mounted in the interior of the door panel assembly 20. As shown in FIG. 1, one of the slabs of foamed padding has an elongate portion cut out so as to accept the strip sensors 32. Additional slabs of foamed padding are then positioned on each side of the slab containing the strip sensors 32.

Figure 15:
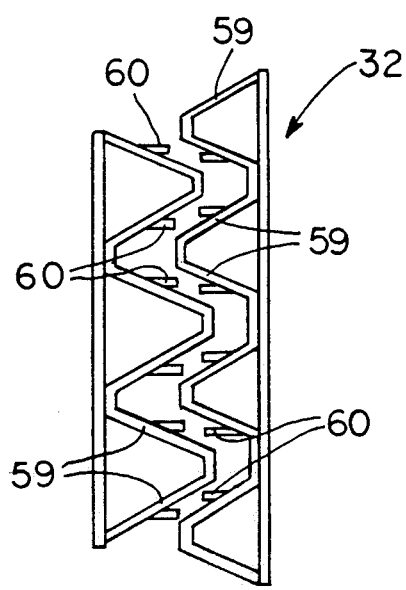
FIG. 15 is an exploded pictorial view of one embodiment of a strip switch sensor-activator used in the invention.

A preferred embodiment of the strip sensor 32, as shown in FIG. 15, is designed to be extremely simple and effective. The sensor 32 comprises a strip switch which provides positive sensing of impact of the door panel 20 by another object which penetrates more than about one inch through the outer door skin 57. The strip switch is inexpensive and gives positive, fail-safe sensing of a collision, while avoiding false signals due to minor impacts of the door. The strip switch comprises first and second strips 59 of electrical conducting material. The strips are mounted within the door panel 20 in closely spaced, parallel configuration, such that upon penetrating impact of the outboard side of the door panel 20 by another object, the closely spaced strips are crushed together to make electrical contact. The electrical contact concurrently activates the inflator 30 to inflate the bag 27. Advantageously, the strips 59 have corrugated ridges and grooves formed therein, with the ridges in one strip nesting within the grooves of the other strip. The sides of the ridges of the strips 59 can be provided with teeth 60 to make positive electrical contact with the other strip when the sensor is crushed together. The teeth prevent malfunction due to buildup of oxide over time on the surfaces of the strips 59. Electrical hookups to the sensors 32 and electrical activation of the pyrotechnic inflator 30 are well known in the art and are not described herein nor illustrated in the drawings.

Although a preferred embodiment of an air bag restraint system in accordance with the invention has been illustrated and described, it is to be understood that the present disclosure is made by way of example and that various other embodiments are possible without departing from the subject matter coming within the scope of the following claims, which subject matter is regarded as the invention.

We claim:

1. An inflatable protective system which provides cushioning and containment of an occupant of a vehicle from side impact of the vehicle by another object, wherein the vehicle has a side panel assembly located adjacent to the end of a seat upon which the occupant to be protected is seated, said side panel assembly containing a window and window opening at the upper end thereof, a window frame and a roof rail adjacent to an upper side of said window, said system comprising an inflatable bag foldable into a collapsed, relatively compact configuration and inflatable to form a substantially broad, planar air cushion having dimensions sufficient to extend over the window opening in said side panel assembly;

means for storing the folded bag within the side panel assembly at a location below said window, with the folded bag being stored in a position facing a flank of the occupant's torso when the occupant is seated on the seat;

inflator means mounted within the side panel assembly and in flow communication with said bag; and impact sensor means mounted within said side panel assembly, said sensor means being capable of activating said inflator means to inflate said bag when another object impacts said side panel assembly with a predetermined force, with the inflated bag forming a shock absorbing cushion for the head and upper torso of the occupant and a cushioning barrier to restrain the occupant's head and neck from moving into the window opening or of striking the window frame and roof rail.

2. An inflatable protective system in accordance with claim 1 wherein the side panel assembly comprises a side door of the vehicle.

3. An inflatable protective system in accordance with claim 1 wherein the vehicle has a roof pillar positioned adjacent to the window in the side panel assembly, and the inflated bag also forms a cushioning barrier to restrain the occupant's head from striking the roof pillar.

4. An inflatable protective system in accordance with claim 1 wherein the means for storing the folded bag comprises a cavity formed within the side panel assembly of the vehicle.

5. An inflatable protective system in accordance with claim 4 wherein a stiffened backup plate is mounted at the inner side of said cavity, with the inflatable bag being folded to lie in a substantially planar orientation adjacent to the backup plate.

6. An inflatable protective system in accordance with claim 5 wherein the inflator means is mounted to the backup plate.

7. An inflatable protective system in accordance with claim 6 wherein the inflator means communicates with said bag through an access opening in said backup plate.

8. An inflatable protective system in accordance with claim 4 wherein said bag comprises two sections, with the first section being attached to the inflator means to expand toward the interior of the vehicle from said cavity upon inflation, and the second section extending from the upper side of said first section to expand upwardly to extend over the window in the side panel assembly.

9. An inflatable protective system in accordance with claim 8 wherein said bag is folded into a substantially planar pouch by folding the second section thereof downwardly in at least two accordion folds to overlie the first section, with said pouch then being inserted into said cavity such that the folded second section faces the interior of the vehicle.

10. An inflatable protective system in accordance with claim 9 wherein the bag, when inflated, has fore and aft extensions fanning out from a central portion thereof to extend to the fore and aft sides of the window.

11. An inflatable protective system in accordance with claim 10 wherein the second section is folded to form said pouch for storage in said cavity by first folding the fore and aft extensions to lie superimposed over the central portion and then folding the central portion with the superimposed fore and aft extensions downwardly in at least two accordion folds to overlie the first section of said bag.

12. An inflatable protective system in accordance with claim 8 wherein the bag comprises two broad sheets of material which face each other and form outboard and inboard sides of the second section of said bag when the bag is inflated, with the outboard side lying adjacent to said side panel assembly and facing the window of said side panel assembly and with the inboard side facing the interior of the vehicle.

13. An inflatable protective system in accordance with claim 12 wherein the two sheets of material forming said second section are stitched together with reinforcing stitching to form at least two spaced, linear ribs radiating generally upwardly and outwardly from said first section of the bag.

14. An inflatable protective system in accordance with claim 12 wherein a plurality of vent openings are provided in the side of the second section of said bag, said vent openings allowing controlled venting of gas during inflation of the bag to moderate pressure peaks within the bag during inflation while also providing jet thrust to the inflating bag to enhance deployment of the bag adjacent to the window of the side panel assembly.

15. An inflatable protective system in accordance with claim 14 wherein at least one vent opening is provided in the first section of said bag for controlled venting of gas during inflation of the bag to moderate pressure peaks within the bag during inflation.

16. An inflatable protective system in accordance with claim 14 wherein touch attachment means are provided on the periphery of the second section of said bag and on the roof rail adjacent to said window to secure the periphery of the second section of the bag to the roof rail when said bag is inflated so as to hold the second section of the bag in place covering the window.

17. An inflatable protective system in accordance with claim 16 wherein the vehicle has a roof pillar positioned adjacent to the window in the side panel assembly, and touch attachment means are also provided on the roof pillar to secure the matching peripery of the second section of the bag to the roof pillar when said bag is inflated.

18. An inflatable protective system in accordance with claim 17 wherein the touch attachment means comprises two part releasable connectors of the hook and loop type, with one part of the connectors being attached to the periphery of the second section of said bag and the second part of the connectors being attached to the roof rail and roof pillar.

19. An inflatable protective system in accordance with claim 4 wherein a cushioning panel of foamed polymeric material is positioned on the inboard side of the side panel assembly lying over the stored, folded bag in said cavity, whereby when said bag is inflated, the cushioning panel is propelled toward the occupant to (1) make initial cushioned contact with the occupant's torso and (2) initiate lateral movement of the occupant away from the side panel assembly so as to minimize the subsequent impact between the side panel assembly and the occupant.

20. An inflatable protective system in accordance with claim 19 wherein said cushioning panel is formed of a first section lying immediately over said cavity in said side panel assembly and a second section lying over the remainder of said side panel assembly below the window, with the first section being attached to the second section by a hinge connecting the lower edge of said first section to said second section, whereby when said bag is inflated, the first section of said cushioning panel pivots about its lower hinged edge to form an opening through which the inflating bag is rapidly ejected outwardly and upwardly from said cavity, while at the same time the inflating bag propels said cushioning panel laterally toward the occupant.

21. An inflatable protective system in accordance with claim 20 wherein the hinge is a live hinge formed by a skin of the foamed polymer material which integrally joins the first and second sections of said cushioning panel.

22. An inflatable protective system in accordance with claim 19 wherein essentially all otherwise void space between the outboard side and inboard side of said side panel assembly is filled with foamed polymeric material to provide additional cushioning and prompt occupant loading during impact of the side panel assembly of the vehicle by another object.

23. An inflatable protective system in accordance with claim 4 wherein said impact sensor means comprises first and second strips of electrical conducting material, with the strips being mounted within said side panel assembly in closely spaced, parallel configuration, such that upon penetrating impact of the outboard side of said side panel assembly by another object, the closely spaced strips are crushed together to make electrical contact which concurrently activates the inflator means to inflate said bag.

24. An inflatable protective system in accordance with claim 23 wherein said first and second strips have corrugated ridges and grooves formed therein, with the ridges in one strip nesting within the grooves of the other strip.

25. An inflatable protective system in accordance with claim 24 wherein locking teeth are formed in the sides of the ridges of said first and second strips whereby the teeth on one strip make positive electrical contact with the other strip when the sensor is crushed together.

26. An inflatable protective system in accordance with claim 23 wherein essentially all otherwise void space between the outboard side and inboard side of said side panel assembly is filled with foamed polymeric material, and the first and second strips of said sensor means are imbedded within the foamed polymeric material in side-by-side, close spaced relationship so as to be immune from minor impacts of the side panel assembly with another object to avoid inadvertent actuation of the inflator means.

* * * * *